United States Patent [19]

Habermann et al.

[11] 4,141,604
[45] Feb. 27, 1979

[54] ELECTROMAGNETIC BEARINGS FOR MOUNTING ELONGATE ROTATING SHAFTS

[75] Inventors: Helmut Habermann; Maurice Brunet, both of Vernon, France

[73] Assignee: Societe Europeene de Propulsion, Puteaux, France

[21] Appl. No.: 753,282

[22] Filed: Dec. 22, 1976

[30] Foreign Application Priority Data

Dec. 24, 1976 [FR] France .................. 75 39761

[51] Int. Cl.² ............................................ F16C 39/00
[52] U.S. Cl. ................................................ 308/10
[58] Field of Search .......................... 308/10, 35, 36

[56] References Cited

U.S. PATENT DOCUMENTS

| 3,124,962 | 3/1964 | Hirtreiter | 308/10 |
|---|---|---|---|
| 3,243,238 | 3/1966 | Lyman | 308/10 |
| 3,316,032 | 4/1967 | Wolf | 308/10 |
| 3,490,816 | 1/1970 | Lyman | 308/10 |
| 3,650,581 | 3/1972 | Boden | 308/10 |
| 3,698,775 | 10/1972 | Gilbert | 308/10 |
| 3,731,984 | 5/1973 | Habermann | 308/10 |
| 3,787,100 | 1/1974 | Habermann | 308/10 |
| 3,860,300 | 1/1975 | Lyman | 308/10 |
| 3,877,761 | 4/1975 | Boden | 308/10 |
| 3,929,390 | 12/1975 | Simpson | 308/10 |

FOREIGN PATENT DOCUMENTS

| 1273897 | 9/1961 | France | 308/10 |
|---|---|---|---|
| 2214890 | 8/1974 | France | 308/10 |
| 2336603 | 7/1977 | France | 308/10 |
| 1418261 | 12/1975 | United Kingdom | 308/10 |

Primary Examiner—R. Skudy
Attorney, Agent, or Firm—Weingarten, Maxham & Schurgin

[57] ABSTRACT

A mounting for an elongate horizontal shaft, for example a rotor shaft of a turbine or compressor, comprises two radial end bearings, and at least one intermediate radial bearing. The intermediate bearing is an electromagnetic bearing and is controlled by a detector responsive to the radial position of the shaft. The use of such an intermediate electromagnetic bearing enables relatively long shafts to be mounted satisfactorily.

7 Claims, 7 Drawing Figures

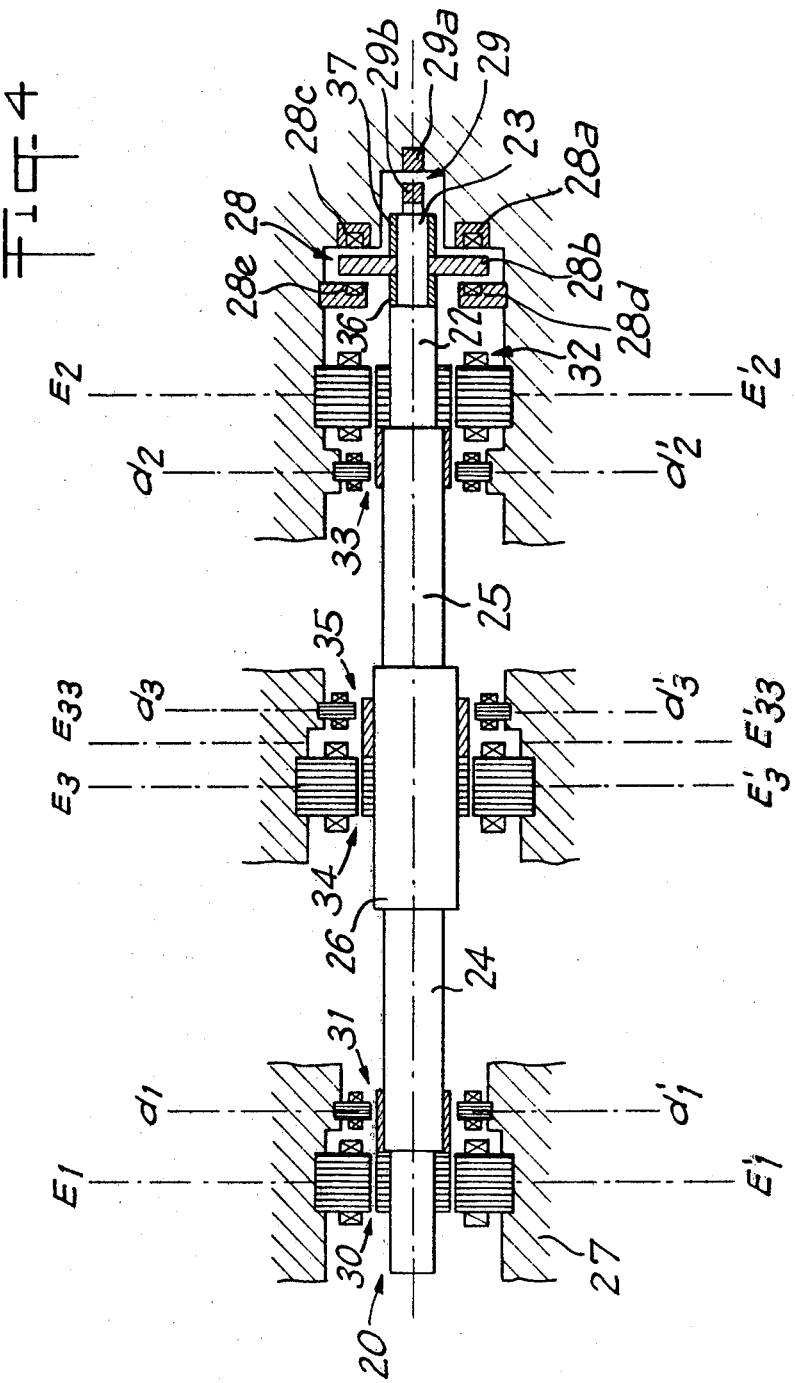

ELECTROMAGNETIC BEARINGS FOR MOUNTING ELONGATE ROTATING SHAFTS

BACKGROUND OF THE INVENTION

1. Field of the Invention

The present invention relates to a mounting for an elongate rotary body, such as a turbine shaft of a turbo machine.

2. Description of the Prior Art

Rotary shafts of compressors or turbines for example, may be mounted by two radial bearings of hydraulic, pneumatic or roller type, disposed in the vicinity of the ends of the shaft. In particular, sealed hydraulic type bearings filled with oil or a viscous fluid have been proposed for this purpose.

In order to increase the performance of a compressor, turbine or other machine it is desirable to increase the length of the shaft. However, it is not possible to mount a shaft of substantial length only by means of two end bearings, as the deformations of the shaft then become too great and the critical rotation frequencies too low. Consequently, it is found necessary to provide for an additional support of the shaft at an intermediate position between the two end bearings. However, the diameter of the shaft must remain substantially greater in the central portion, as otherwise the rigidity of the shaft might become too low. This rules out the utilisation of an additional hydraulic bearing. Indeed, a hydraulic bearing mounted around a shaft of large diameter gives rise to too great a braking action. In addition, the installation of a hydraulic bearing in the central portion of the shaft would involve the presence of seal packings in the middle of the machine.

These difficulties in mounting an adequate support at the centre of the machine have given rise to shafts of restricted length, and, to increase the performance of a machine, it is necessary to couple two shafts in series. Each shaft, mounted in an independent body, is supported by two end bearings. Seal packings are disposed at both ends of the shaft.

It has been proposed to mount vertical shafts of substantial length, for example vacuum pump rotor shafts, with the aid of an assembly of magnetic bearings. Such a type of assembly is described for example in French Pat. No. 2,052,314. Such a mounting comprises at one or each of the ends of the shaft, a supporting magnet which generates a constant magnetic field. In addition, auxiliary devices for the stabilisation of the shaft in a radial direction, which may possibly be placed away from the supporting magnets or electro-magnets, cooperate with the latter to ensure a stable holding of the shaft. However, since the shaft has a substantially vertical axis of rotation, the supporting magnet or magnets generate a constant magnetic field with a vertical component which holds the shaft in a stable position vertically, while the stabilisation devices, which are not supporting, ensure only radial stabilisation in one or more horizontal planes, and use reduced power. The stabilisation devices which comprise at least one detector of the radial position of the shaft, electro-magnetic means for generating magnetic fields acting on radially orientated ferromagnetic parts of the shaft, as well as an apparatus for controlling the electromagnetic means from the signals supplied by the detectors, are provided essentially, not to generate a magnetic field proper of a certain value, but to modify the magnetic field of the supporting magnets. In certain cases, when the vertical shaft is very long, and not very rigid, one or two horizontal stabilisation units may be distributed along the rotor to damp oscillations. In the latter case, the shaft itself must be ferromagnetic, and the stabilisation units cooperate directly with the shaft.

Thus, with this previously proposed mounting, it is possible to utilise shafts of great length only in a vertical orientation, with an end bearing, of passive type, which effects the support of the shaft, while one or more low power stabilisation magnetic devices, of active type, contribute to a horizontal stabilisation of the shaft. In addition, as a consequence of the separation of the support and stabilisation functions, this previously proposed mounting is suitable for shafts having low bending rigidity only.

SUMMARY OF THE INVENTION

According to the present invention, there is provided a mounting for an elongate rotary body having a substantially horizontal axis of rotation and opposite end portions, said mounting comprising two first radial bearings supporting the body at its respective end portions at least one active electromagnetic radial bearing for supporting the body in an intermediate zone between the two end portions, said electromagnetic bearing comprising an annular armature mounted on the shaft, and a fixed armature surrounding the annular armature and spaced therefrom by a small distance, and at least one radial detector for sensing the position of the rotary body, said detector being operative to control the electromagnetic bearing in such a manner as to provide a support for the rotary body in the said intermediate zone.

The radial intermediate bearing, of the active electromagnetic type, may be used in several advantageous manners. On the one hand, used as a bearing proper, it provides a bearing support having a rigidity equal or greater than that of hydraulic bearings. The critical speed of the shaft will then be greater than the critical speed of an equivalent shaft mounted without such an intermediate radial bearing. Moreover, it can be used as a damping device in which case the bearing provides a support of low rigidity to facilitate, without creating substantial excess tension, passage of the shaft beyond its critical speed which remains unaltered. Finally, the intermediate electromagnetic bearing may be used as a joint system, that it to say at the same time as a bearing which increases the critical speed and as a damping device facilitating the passing of this critical speed.

The mounting may comprise several intermediate electromagnetic radial bearings, each controlled by one or more radial detectors.

Such an assembly, in which the shaft is centered radially by electromagnetic bearings at different axial locations, permits damping any movement of nutation or of precession of the axis of rotation of the shaft, as well as any vibration. In addition, the detectors associated with the electromagnetic bearings need not be disposed in the immediate vicinity of the electromagnetic bearings, but at those positions at which the deformations are a maximum, and thus facilitate the control of the damping action provided by the intermediate electromagnetic bearings for several critical speeds.

The two end radial bearings, and an end axial thrust bearing may each be of electromagnetic type and controlled by one or more detectors. The shaft is thus completely suspended electromagnetically at the same time by two end active radial electromagnetic bearings and by one or more intermediate active electromagnetic radial bearings. This mounting is particularly advantageous for sealed machines such as, for example, turbo-engines for nuclear plant. Indeed, all the sealing and supply devices which hydraulic bearings require are obviated. In addition, energy consumption due to the friction of the bearings is reduced. Moreover, bearings of electromagnetic type lend themselves well to an incorporation inside the machine and permit an easy correction, for example, of the alignment defects introduced at the time of assembly.

BRIEF DESCRIPTION OF THE DRAWINGS

Embodiments of the invention will now be described, by way of example only, with reference to the accompanying diagrammatic drawings, in which:

FIG. 4 is an axial section of a modified form of shaft mounting; and

DESCRIPTION OF THE PREFERRED EMBODIMENTS

Figure 1:
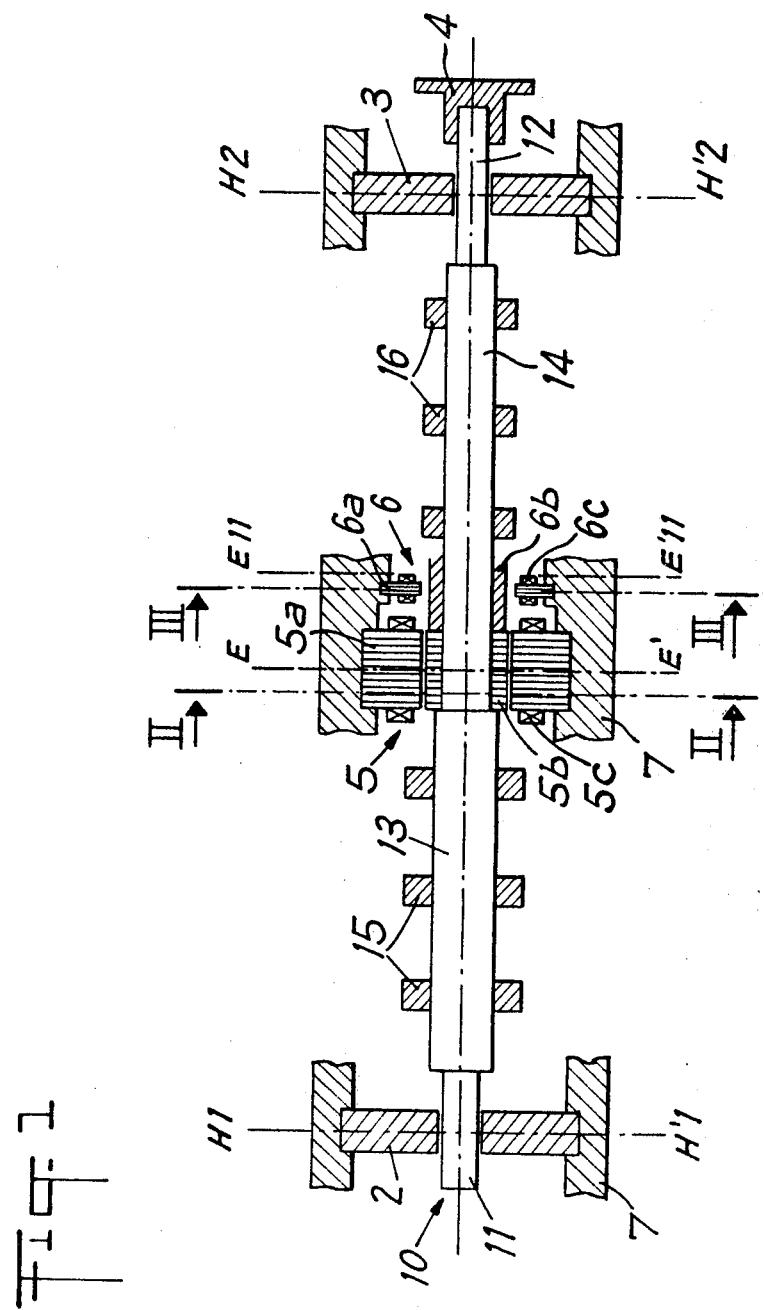
FIG. 1 is an axial cross-section of a shaft mounting in accordance with the invention.

There is shown in FIG. 1 an elongate rotary body in the form of a rotor shaft 10 which may be mounted for example in a compressor or a turbine. The shaft 10 has ends 11 and 12 of small diameter. Oil bearings 2 and 3, having respectively as a plane of symmetry the radial planes $H_1$-$H'_1$ and $H_2$-$H'_2$, support the shaft 10 at its ends 11 and 12 respectively. An axial hydraulic thrust bearing 4 is in addition disposed at one end 12 of the shaft 10. The oil bearings 2 and 3, as well as the axial thrust bearing 4 are of conventional type and are represented schematically in FIG. 1. The rotary shaft 10 comprises between its two ends 11 and 12 two larger portions 13 and 14, whose diameters are different. Elements 15 and 16 distributed along the length of the portions 13 and 14 of the shaft 10 represent schematically, components, such as wheels, which may be borne by the shaft 10 when it is mounted, for example, in a turbine. The shaft 10 is supported at the level of its portions 13 and 14 by an active electromagnetic radial bearing 5, which has, as its plane of symmetry, plane E-E'. The electromagnetic radial bearing 5 is disposed substantially at an equal distance from the two end oil bearings 2 and 3. An annular armature 5b of the electromagnetic radial bearing 5 abuts against a shoulder of the shaft 10 which separates portions 13 and 14. An electromagnetic radial detector 6 is associated with the electromagnetic radial bearing 5 and permits slaving the latter by means of known circuits which have not been represented. No representation has been given on the figure of the fluid supply ducts for the hydraulic bearings, or of the current supply wires of the windings of the magnetic bearing 5 and of the detector 6.

Figures 2, 3:
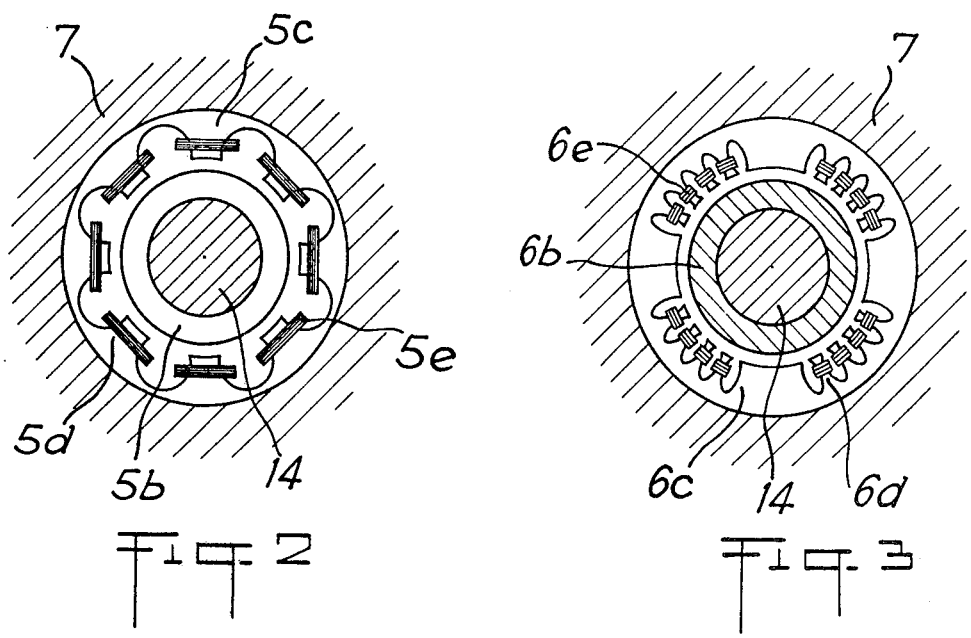
FIGS. 2 and 3 are fragmentary enlarged diagrammatic sections taken on line II—II and III—III of FIG. 1.

The electromagnetic radial bearing 5 comprises, in a manner known per se, an annular armature 5a, formed preferably as a pack of metal sheets or of foiled iron, fixed to the frame 7 of the machine, and surrounding at a short distance the armature 5b mounted on the shaft 10. As may be seen more particularly in FIG. 2, the armature 5a is composed of a pole piece 5c which has an outer annular portion and branches 5d projecting radially inwards and each surrounded by a coil 5e, the directions of winding of adjacent coils being opposite. The radial detector 6 disposed in the vicinity of the bearing 5 may be constituted in a manner similar to that illustrated more particularly by FIG. 3 wherein an armature 6a has a pole piece 6c which has branches 6d around which coils 6e are disposed.

The electromagnetic radial bearing 5 may be situated, as represented in FIG. 1, substantially at equal distances from the end oil bearings 2 and 3. This condition is however not an essential one and the location of the magnetic bearing 5 may be determined according to different criteria. The magnetic bearing 5 may, for example, be placed in such a manner as to support shaft 10 in the immediate vicinity of the centre of gravity of the latter. For reasons of convenience of assembly, the magnetic bearing 5 may be situated preferably at the level of a separation of the shaft 10 into two portions 13, 14 corresponding to two stages of the machine performing two different tasks (for example at the level of a separation between a high pressure stage and a low pressure stage). The magnetic bearing 5 may also be displaced both relative to the middle of shaft 10 and relative to the centre of gravity of shaft 10 and have as a plane of symmetry, a plane such as plane $E_{11}$-$E'_{11}$ of FIG. 1. The magnetic bearing 5, used as a damper device, will have more or less considerable influence at the time of the passing of the various critical speeds of shaft 10, as a function of the displacement of its position relative to the middle of the shaft.

The single magnetic bearing 5 may be replaced, in the assembly of FIG. 1, by a plurality of electromagnetic radial bearings 5 of the same type associated with radial detectors, which electromagnetic bearings 5 are then distributed along shaft 10 in the area situated between planes $H_1$-$H'_1$ and $H_2$-$H'_2$. In this case, the electromagnetic radial bearings may be distributed in regular fashion. However, when shaft 10 has different portions of different diameter, the electromagnetic radial bearings 5 may be unevenly distributed in such a manner as to be placed at the points where the load is greater, or abut against the shoulders formed at the level of the separation between two different sections. In the case of several intermediate bearings 5, the radial detectors 6 associated with the intermediate bearings 5 are placed preferably at the places where deformation is greatest. The number of radial detectors 6 may be greater than the number of electromagnetic radial bearings 5. For example, three radial detectors 6 may be associated with the same magnetic bearing 5. One of the three detectors is then provided to follow the variations of the sag of the shaft under the action of gravity, while the other two detectors are used for differential measurements. Advantageously, there may be adopted for the radial detectors 6 an arrangement similar to that which has been described in French Patent Application No. 73/01786 of 18th Jan., 1973, called "A Detection Device for a Magnetic Bearing". The exciter currents of the coils 5e of the radial bearings 5 are controlled from the signals supplied by the detectors 6. The slaving of the bearings 5 from the detectors 6 may be achieved from the circuits described in French Patent No. 2,149,644 of 18th Aug., 1971.

In the embodiment of FIG. 4 a shaft 20 is completely suspended electromagnetically by means of an axial electromagnetic bearing 28 and electromagnetic radial bearings 20, 32 and 34. The shaft 20 represented in FIG.

4 comprises several portions of different diameters. The portions 21 and 22, 23 situated at the ends of the shaft have a slightly reduced diameter. The intermediate portions 24, 25 and the central portion 26 have a greater diameter. This structure of the shaft 20, as well as that of shaft 10 of FIG. 1, is given only for the sake of example and the mounting according to the invention can of course be adapted to shafts of every different shape. Thus, the arrangement of the electromagnetic bearings of FIG. 4 could just as well as be applied to shaft 10 of FIG. 1.

In FIG. 4, the axial electromagnetic bearing 28, situated at the level of the end 23 of the shaft 20, comprises an annular armature 28b mounted an the portion 23 of shaft 20 and held axially between two bushes 36 and 37. A fixed armature 28a of the axial bearing 28 has two annular ferromagnetic bodies 28c and 28d provided with coils 28e and situated on either side of the armature 28b. An axial electromagnetic detector 29, disposed at the end 23 of the shaft 20, is composed of an armature 29a solid with the frame of the machine, and of an armature 29b facing the armature 29a and housed in a recess made in the radial face of the end 23 of shaft 20. The armature 29b and the shaft 20 are co-axial.

The end radial electromagnetic bearings 30 and 32 having respectively as their planes of symmetry, the radial planes $E_1-E'_1$ and $E_2-E'_2$ are disposed in the vicinity of the ends of the rotor 20, at the level of the portions 21 and 22. The radial electromagnetic bearing 34, which has as its plane of symmetry, plane $E_3-E'_3$, is disposed substantially at an equal distance from planes $E_1-E'_1$ and $E_2-E'_2$ and is situated at the level of the central portion 26 of the shaft 20. Radial electromagnetic detectors 31, 33, 35 are associated respectively with the electromagnetic radial bearings 30, 32, 34. Bearings 30, 32, 34 and detectors 31, 33, 35 have a structure similar respectively to bearing 5 and detector 6 of FIG. 1.

As in the example represented in FIG. 1, the intermediate bearing 34 need not be situated exactly at the middle of the span of the shaft 20 extending between the two end bearings 30 and 32. Similarly, several intermediate bearings 34 associated with several detectors 35, may be interposed between the two end bearings 30 and 32.

The intermediate bearing 34, as bearing 5 in FIG. 1, contributes towards an efficient support of a shaft 20 of great length.

In addition, the elimination of all oil bearings is particularly advantageous and suited to oil-tight machines. The integral electromagnetic suspension of the shaft 20 is adapted to support a rotor of considerable mass, does away with all additional sources of fluid supply and permits trouble-free operation in a rarefield atmosphere.

In the mounting of FIG. 4, the presence of two radial magnetic bearings 30 and 32 at the ends of shaft 20 and of at least one third magnetic bearing 34 in the central portion of the shaft 20 imparts considerable flexibility in the control of the support of the shaft. Indeed, it is possible to impart to each of the three bearings 30, 32, 34 suitable rigidity and damping in such a manner, on the one hand, as to supply good conditions of stability of the shaft line and, on the other hand, to promote the passing of the critical frequencies. In particular, each of the bearings 30, 32, 34 may be slaved by several of the detectors 31, 33, 35. As in the case of the mounting of FIG. 1, the servo-circuits may be of the type described in above-mentioned French Pat. No. 2,149,644. The magnetic bearings 30, 32, 34 may also be slaved by the detectors 31, 33, 35 in such a manner as to correct the alignment defects created at the time of assembly.

The servo-circuits suited for increasing the damping effect of the electromagnetic radial bearings when the critical speeds are passed are advantageously of the type described in French Pat. No. 75/39760 and entitled: "A Device for Damping the Critical Frequencies of a Magnetically Suspended Rotor".

The importance of the choice of the situation of the intermediate electromagnetic radial bearings so that the latter, operating as damping devices, should promote the passing of the critical speeds of the shaft without excessive over-stresses, is explained with reference to FIGS. 5a, 5b, 5c, by considering a single intermediate electromagnetic radial bearing 34.

Figure 5A:
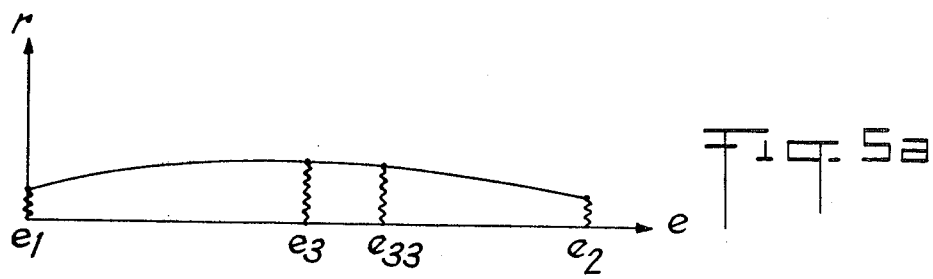
FIGS. 5a, 5b, 5c show the deformations of the shaft when the first, second and third critical speeds are passed.
Figure 5B:
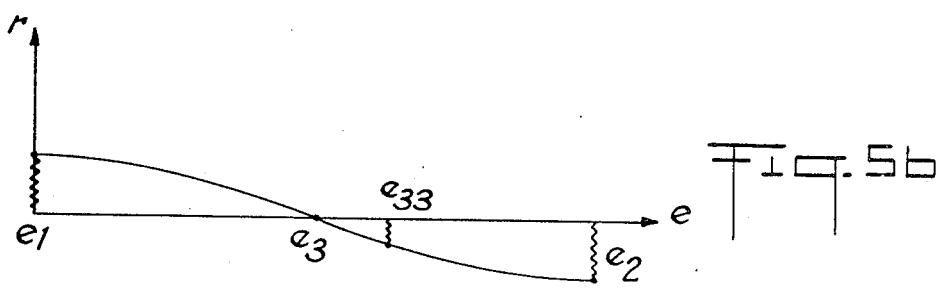
Figure 5C:
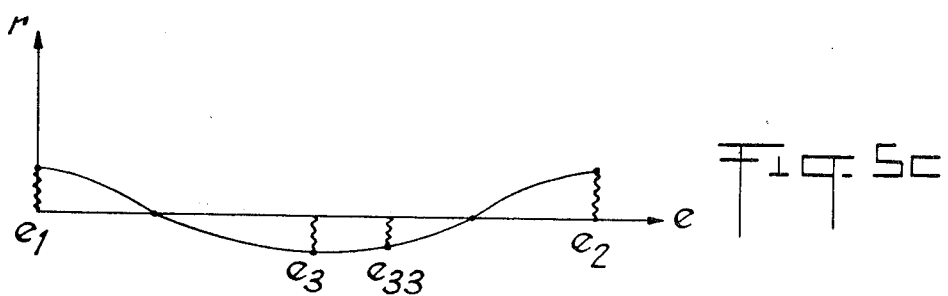

FIGS. 5a, 5b, 5c represent the pattern of the deformations of the shaft 20 in a radial direction respectively when it reaches the first, the second and the third critical speeds. In FIG. 5a, corresponding to the first critical speed, the deformation exhibits a minimum at the level of the end bearings 30 and 32 designated on the Figures by $e_1$ and $e_2$, and an antinode at the middle of the shaft, at the level of bearing 34 designated on the figure by $e_3$. On FIG. 5b corresponding to the second critical speed, the deformation shows an antinode at the level of the ends $e_1$ and $e_2$, and a node at the level of the middle $e_3$ of the shaft. In FIG. 5c, corresponding to the third critical speed, the deformation forms a node between each of the ends $e_1$ and $e_2$ and the middle $e_3$ of the shaft, which middle $e_3$ corresponds to an antinode. The patterns corresponding to the critical speeds greater than the third are not represented. FIGS. 5a to 5c clearly show that the central magnetic bearing $e_3$, can act in such a manner as to reduce the deformation of the shaft for the first and third critical speeds, as it is situated at the level of antinode. On the other hand, for the second critical speed, it remains inoperative, for it is then situated at the level of a node. However, if the central magnetic bearing is shifted relative to the middle $e_3$ to set it in the position referenced by $e_{33}$ in FIG. 5, the magnetic bearing will have an action at the same time for the first second and third critical speeds. The action for the first and third critical speeds will, however, be slightly attenuated, as position $e_{33}$ no longer corresponds to the maximum deformation of the shaft.

The outcome of the foregoing is that it is possible to determine as desired the situation of the intermediate electromagnetic radial bearings in relation to the patterns of the deformations of the shaft at critical speeds, in such a manner as to obtain an appropriate action.

Similarly, the radial detectors 31, 33, 35 need not remain as in FIG. 4 in the planes $d_1-d_1'$, $d_2-d_2'$, $d_3-d_3'$, in the immediate vicinity of bearings 30, 32, 34. On the contrary, the detectors 31, 33, 35 which are easily displaceable, may be positioned in such a manner as to take the curves of FIGS. 5a to 5c into account.

In modified arrangements (not shown) detectors other than electro-magnetic detectors, for example optical or capacitive detectors could be used.

In the mountings particularly described, the presence of at least one active electromagnetic radial bearing in an intermediate area between the ends of the shaft permits the use of a shaft of substantial length, as the additional support restricts the sag of the shaft and permits increasing the critical speeds of rotation and/or going beyond them under good control conditions. In addition, this bearing, being of electromagnetic type, does not introduce any additional friction and requires no limitation of the diameter of the shaft. The latter may thus have a high inertia and a great rigidity. The electromagnetic bearing does not require any seal packing, and lends itself well to the assembly and disassembly of the machine.

The or each intermediate active electromagnetic radial bearing is able to ensure not only a radial stabilisation of the movement of the shaft, but also a support of the latter, as a consequence of the fact that it has, in addition to a reduced gap, a ring armature of its own mounted on the shaft, and is able to generate its own magnetic field of relatively high value. Thus, the functions of support and stabilisation of the shaft in the intermediate area between the end bearings are provided by one and the same bearing, of active electromagnetic type.

The possibility of using a long shaft mounted by two end radial bearings and one or more intermediate electromagnetic radial bearings, brings about considerable savings of power consumption and manufacturing costs. Indeed, account being taken of the restricted length of the shafts at present usable, it is necessary to couple in series several different shafts, each mounted in an independent body. A single shaft of a length double that of the shaft previously used, mounted with an intermediate electromagnetic radial bearing, makes it possible to construct a machine in one body only, with performance characteristics comparable with those of previously proposed machines comprising two bodies, but at substantially reduced cost. Furthermore, the power consumed is reduced, as a result of the omission of two oil bearings, a thrust bearing and two oil seals. In addition, the consequent reduction, by a half, of the oil flow brings with it a reduction of pumping power, and the mounting in one body enables the use of only one balancing piston with a corresponding reduction of the leakage flow. Moreover, the weight and the overall length of the machine are low and permit a lightening of the support blocks and therefore a less expensive structure.

What is claimed is:

1. A mounting assembly, including frame means, for an elongate rotary body having a substantially horizontal axis of rotation and opposite end portions, said mounting assembly comprising radial bearings supporting the body at its respective end portions, and at least one active electromagnetic radial bearing for supporting the body intermediate the end portions thereof, said electromagnetic bearing comprising an annular armature mounted on the body, a fixed armature mounted to said frame means disposed around and spaced from the annular armature, said electromagnetic bearing having coils mounted on said fixed armature, and at least one detector, a portion of which is mounted to said frame means and another portion of which is mounted to said rotary body, for sensing the radial position of the rotary body intermediate the end portions thereof, signals from said detector being operative to control the magnetic field produced between said fixed armature and said annular armature of the electromagnetic bearing to provide a support of predetermined rigidity for the rotary body.

2. A mounting assembly according to claim 1, wherein said electromagnetic radial bearing is disposed in the vicinity of the centre of gravity of the rotary body.

3. A mounting assembly according to claim 1, wherein said electromagnetic radial bearing is displaced from the centre of the body between the end bearings.

4. A mounting assembly according to claim 1, wherein each said end bearing comprises an active electromagnetic radial bearing having an annular armature mounted on the rotary body, a fixed armature mounted to said frame means and disposed around and spaced from said annular armature, and at least one detector for sensing the radial position of the rotary body in the vicinity of said bearing, a portion of said detector being mounted to said frame means, another portion of which is mounted to said rotary body, signals from said detector being operative to control said electromagnetic bearing to provide a support of predetermined rigidity for the rotary body.

5. A mounting assembly according to claim 4 wherein at least one of said radial bearings is located on the rotary body at an axial position thereon spaced apart from the axial position at which the detector is located.

6. A mounting assembly according to claim 4, wherein the number of detectors for controlling the electromagnetic bearings is greater than the number of said bearings.

7. A mounting assembly according to claim 4 wherein at least one of said end bearings further comprises electromagnetic axial end thrust bearings, said bearing comprising a disc-shaped armature mounted on the rotary body, a fixed armature cooperating with the disc-shaped armature, and at least one detector for sensing the axial position of the rotary body, said axial position detector being located adjacent one end portion of the rotary body, and being adapted to supply a signal to one of said armatures for controlling the axial position of the rotary body.

* * * * *